(12) United States Patent
Quade

(10) Patent No.: US 7,004,710 B1
(45) Date of Patent: Feb. 28, 2006

(54) HYDRAULIC BATTERY CHANGER

(76) Inventor: Jim D. Quade, 45608 232nd St., Madison, SD (US) 57042

(*) Notice: Subject to any disclaimer, the term of this patent is extended or adjusted under 35 U.S.C. 154(b) by 70 days.

(21) Appl. No.: 10/787,418

(22) Filed: Feb. 26, 2004

(51) Int. Cl.
    *B65G 67/02* (2006.01)

(52) U.S. Cl. .................... 414/395; 414/400; 104/34; 320/109

(58) Field of Classification Search .............. 414/280, 414/395, 400; 104/39, 34; 320/109
    See application file for complete search history.

(56) References Cited

U.S. PATENT DOCUMENTS

| | | | | |
|---|---|---|---|---|
| 384,562 A * | 6/1888 | Condict | .................. | 104/34 |
| 668,108 A * | 2/1901 | Mailloux | .................. | 104/34 |
| 1,566,089 A * | 12/1925 | Harding | .................. | 104/34 |
| 2,857,036 A * | 10/1958 | Leiser | .................. | 198/721 |
| 3,122,244 A * | 2/1964 | Corso | .................. | 414/462 |
| 3,139,196 A * | 6/1964 | Legocki | .................. | 414/111 |
| 4,101,038 A * | 7/1978 | Palma | .................. | 104/34 |
| 4,120,411 A * | 10/1978 | Johnson | .................. | 414/351 |
| 4,227,463 A * | 10/1980 | Pfleger | .................. | 104/34 |
| 4,283,164 A * | 8/1981 | Reaney | .................. | 414/396 |
| 4,334,819 A | 6/1982 | Hammerslag | | |
| 4,450,400 A | 5/1984 | Gwyn | | |
| 4,808,058 A | 2/1989 | Carney et al. | | |
| 4,983,903 A * | 1/1991 | Bae et al. | .................. | 320/128 |
| 5,091,687 A * | 2/1992 | Meyer et al. | .................. | 320/109 |
| 5,187,423 A | 2/1993 | Marton | | |
| 5,425,159 A * | 6/1995 | Kluttermann et al. | ..... | 19/159 A |
| 5,452,983 A | 9/1995 | Parmley, Sr. | | |
| 5,508,597 A | 4/1996 | Parmley, Sr. | | |
| 5,612,606 A * | 3/1997 | Guimarin et al. | .......... | 320/109 |
| 5,668,460 A * | 9/1997 | Lashlee et al. | ............. | 320/109 |
| 5,998,963 A * | 12/1999 | Aarseth | .................. | 320/109 |
| 6,094,028 A * | 7/2000 | Gu et al. | .................. | 320/109 |
| 6,371,230 B1 * | 4/2002 | Ciarla et al. | .............. | 180/68.5 |
| 6,896,468 B1 * | 5/2005 | Gallea et al. | .............. | 414/395 |

* cited by examiner

*Primary Examiner*—Thomas J. Brahan

(57) ABSTRACT

A hydraulic battery changer for pulling and pushing batteries into a conventional electric vehicle having a height adjustable leg connected to a frame for raising and lowering the frame. A roller is rotatably connected to the frame for receiving a conventional electric vehicle battery thereupon.

10 Claims, 4 Drawing Sheets

HYDRAULIC BATTERY CHANGER

BACKGROUND OF THE INVENTION

1. Field of the Invention

The present embodiment of the invention relates to a hydraulic battery changer for use in connection with electric vehicle battery conveying apparatus. The hydraulic battery changer has particular utility in connection with electric vehicle battery conveying apparatus having a height adjustable roller rack with an extendable scissors mechanism.

2. Description of the Prior Art

Hydraulic battery changers are desirable for replacing batteries on electrical vehicles that have batteries entered horizontally into the electrical vehicle. A need was felt for a hydraulic battery changer that had a height adjustable roller rack to accommodate vehicles having differing amounts of tire wear and different battery storage heights and an extendable scissors mechanism for space savings.

The use of electric vehicle battery conveying apparatus is known in the prior art. For example, U.S. Pat. No. 5,508,597 to Parmley, Sr. discloses a quick exchange battery apparatus for battery powered vehicles and method therefor for storing and changing battery packs from a battery powered vehicle. The battery powered vehicle drives toward a light source which aligns the battery powered vehicle with the apparatus. The apparatus is moved in a horizontal plane to a position underneath a battery holding location on the battery powered vehicle. An operator moves pneumatic carrier to a position directly underneath a battery pack located in the battery holding location. The apparatus is then moved in a vertical plane so that the pneumatic carrier engages a bottom section of the battery pack. The pneumatic carrier is then activated thereby lifting the battery pack on a cushion of air. This allows the operator to move the battery pack out of the battery holding location, across a platform deck of the apparatus, and to a storage location. The operator can then use the pneumatic carrier to move a fresh battery pack located in a different storage location to the battery powered vehicle. However, the Parmley, Sr. '597 patent does not have a height adjustable rack, does not have rollers, and does not have an extendable scissors mechanism.

Similarly, U.S. Pat. No. 5,187,423 to Marton discloses a system for replenishment of energy stored in a battery on an electric vehicle The energy replenishment system offers uninterrupted operation for electric vehicles by instantly removing batteries by lifting device from their compartment when discharged, transferring them into charging shelf having similar compartments, and by placing recharged batteries in the vehicle's compartments. Automatic connector devices instantly operated by the lifting device provides high contact pressure and low contact resistance for the heavy currents on the battery terminals. However, the Marton '423 patent does not have a height adjustable rack, does not have rollers, and does not have an extendable scissors mechanism.

Likewise, U.S. Pat. No. 4,808,058 to Carney et al. discloses a battery handling machine consisting of a framework adapted to stand beside a vehicle and having a floor in substantial alignment with a battery support bed of the vehicle. Longitudinal track devices extend parallel to the floor on the framework and spaced from the floor to receive the battery between the floor and the track devices. A transport mechanism has drive devices coupled to the track devices for operation to move the transport mechanism longitudinally along the track devices and a coupling assembly is attached to the transport mechanism for movement with the transport mechanism and includes an upwardly biased connector adapted to releasably engage the battery so that on operation of the transport mechanism the battery may be loaded onto or unloaded from the floor. However, the Carney et al. '058 patent does not have a height adjustable rack, does not have rollers, and does not have an extendable scissors mechanism.

Correspondingly, U.S. Pat. No. 5,452,983 to Parmley, Sr. discloses An apparatus and method for replacing a battery pack in a battery powered vehicle, and provides a fast and easy way to change a discharged battery pack for a fresh battery pack. The vehicle is backed up to the platform of the apparatus, and a bridge piece spans the gap between the platform and the vehicle. The operator then uses a pneumatic forklift to lift the battery pack in the vehicle on a cushion of air. This allows the operator to easily move the battery pack from the vehicle, across the bridge piece, and across the platform of the apparatus to a storage location. The operator can then use the pneumatic forklift to move a fresh battery pack from a different storage location to the vehicle. However, the Parmley, Sr. '983 patent does not have a height adjustable rack, does not have rollers, and does not have an extendable scissors mechanism.

Further, U.S. Pat. No. 4,450,400 to Gwyn discloses a system for replacing electrical batteries in electrically powered vehicles in a minimum period of time on the order of one minute or less. Carriage-elevator structure is arranged in front of a battery charging station to transfer selected batteries between the charging station and a parked stationary vehicle. The vehicle and the charging station are provided with roller support units adapted to bear the battery weight and permit manual push-and/or pull shift of individual batteries to or from the aforementioned elevator. The system enables a substantially discharged battery to be removed from a vehicle and replaced with a fully charged battery in a very short time. However, the Gwyn '400 patent does not have a height adjustable rack, does not have rollers, and does not have an extendable scissors mechanism.

Lastly, U.S. Pat. No. 4,334,819 to Hammerslag discloses a battery charging system for battery-powered vehicles has a battery transfer station, at which a vehicle is positioned for removal and replacement of the spent and charged battery. The spent battery is removed from the vehicle and transferred to a charging system, and a charged battery is transferred from the charging system to the vehicle. In one form, the batteries are conveyed through a continuous charging system, upon removal from the vehicle, and a fully charged battery is deposited in the vehicle. In another form, batteries are transferred from and to the vehicle by a battery transfer system which transfers the batteries to and from storage and charging bays. In all cases, the discharged battery is removed from the vehicle, and a charged battery is installed in the vehicle. However, the Hammerslag '819 patent does not have a height adjustable rack, does not have rollers, and does not have an extendable scissors mechanism.

While the above-described devices fulfill their respective, particular objectives and requirements, the aforementioned patents do not describe a hydraulic battery changer that allows electric vehicle battery conveying apparatus having a height adjustable roller rack with an extendable scissors mechanism. The Parmley, Sr. '597, Marton '423, Carney et al. '058, Parmley, Sr. '983, Gwyn '400 and Hammerslag '819 patents make no provision for a height adjustable roller rack with an extendable scissors mechanism.

Therefore, a need exists for a new and improved hydraulic battery changer which can be used for electric vehicle battery conveying apparatus having a height adjustable roller rack with an extendable scissors mechanism. In this regard, the present embodiment of the invention substantially fulfills this need.

In this respect, the hydraulic battery changer according to the present embodiment of the invention substantially departs from the conventional concepts and designs of the prior art, and in doing so provides an apparatus primarily developed for the purpose of electric vehicle battery conveying apparatus having a height adjustable roller rack with an extendable scissors mechanism.

SUMMARY OF THE INVENTION

In view of the foregoing disadvantages inherent in the known types of electric vehicle battery conveying apparatus now present in the prior art, the present embodiment of the invention provides an improved hydraulic battery changer, and overcomes the above-mentioned disadvantages and drawbacks of the prior art. As such, the general purpose of the present embodiment of the invention, which will be described subsequently in greater detail, is to provide a new and improved hydraulic battery changer and method which has all the advantages of the prior art mentioned heretofore and many novel features that result in a hydraulic battery changer which is not anticipated, rendered obvious, suggested, or even implied by the prior art, either alone or in any combination thereof.

To attain this, the present embodiment of the invention essentially comprises a height adjustable leg connected to a frame for raising and lowering the frame. A roller is rotatably connected to the frame for receiving a conventional electric vehicle battery thereupon.

There has thus been outlined, rather broadly, the more important features of the embodiment of the invention in order that the detailed description thereof that follows may be better understood and in order that the present contribution to the art may be better appreciated.

The present embodiment of the invention may also include an extendable scissors mechanism, a pull knob, a push panel, a scissors drive chain, a drive motor, a control panel and a slotted pulling bracket. There are, of course, additional features of the present embodiment of the invention that will be described hereinafter and which will form the subject matter of the claims attached.

Numerous objects, features and advantages of the present embodiment of the invention will be readily apparent to those of ordinary skill in the art upon a reading of the following detailed description of presently preferred, but nonetheless illustrative, embodiments of the present embodiment of the invention when taken in conjunction with the accompanying drawings. In this respect, before explaining the current embodiment of the embodiment of the invention in detail, it is to be understood that the embodiment of the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present embodiment of the invention.

It is therefore an object of the present embodiment of the invention to provide a new and improved hydraulic battery changer that has all of the advantages of the prior art electric vehicle battery conveying apparatus and none of the disadvantages.

It is another object of the present embodiment of the invention to provide a new and improved hydraulic battery changer that may be easily and efficiently manufactured and marketed.

An even further object of the present embodiment of the invention is to provide a new and improved hydraulic battery changer that has a low cost of manufacture with regard to both materials and labor, and which accordingly is then susceptible of low prices of sale to the consuming public, thereby making such hydraulic battery changer economically available to the buying public.

Still another object of the present embodiment of the invention is to provide a new hydraulic battery changer that provides in the apparatuses and methods of the prior art some of the advantages thereof, while simultaneously overcoming some of the disadvantages normally associated therewith.

Even still another object of the present embodiment of the invention is to provide a hydraulic battery changer for electric vehicle battery conveying apparatus having a height adjustable roller rack for accommodating vehicles having different tire wears and differing battery storage heights.

Lastly, it is an object of the present embodiment of the invention is to provide a hydraulic battery changer for electric vehicle battery conveying apparatus having an extendable scissors mechanism.

These together with other objects of the embodiment of the invention, along with the various features of novelty that characterize the embodiment of the invention, are pointed out with particularity in the claims annexed to and forming a part of this disclosure. For a better understanding of the embodiment of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The embodiment of the invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
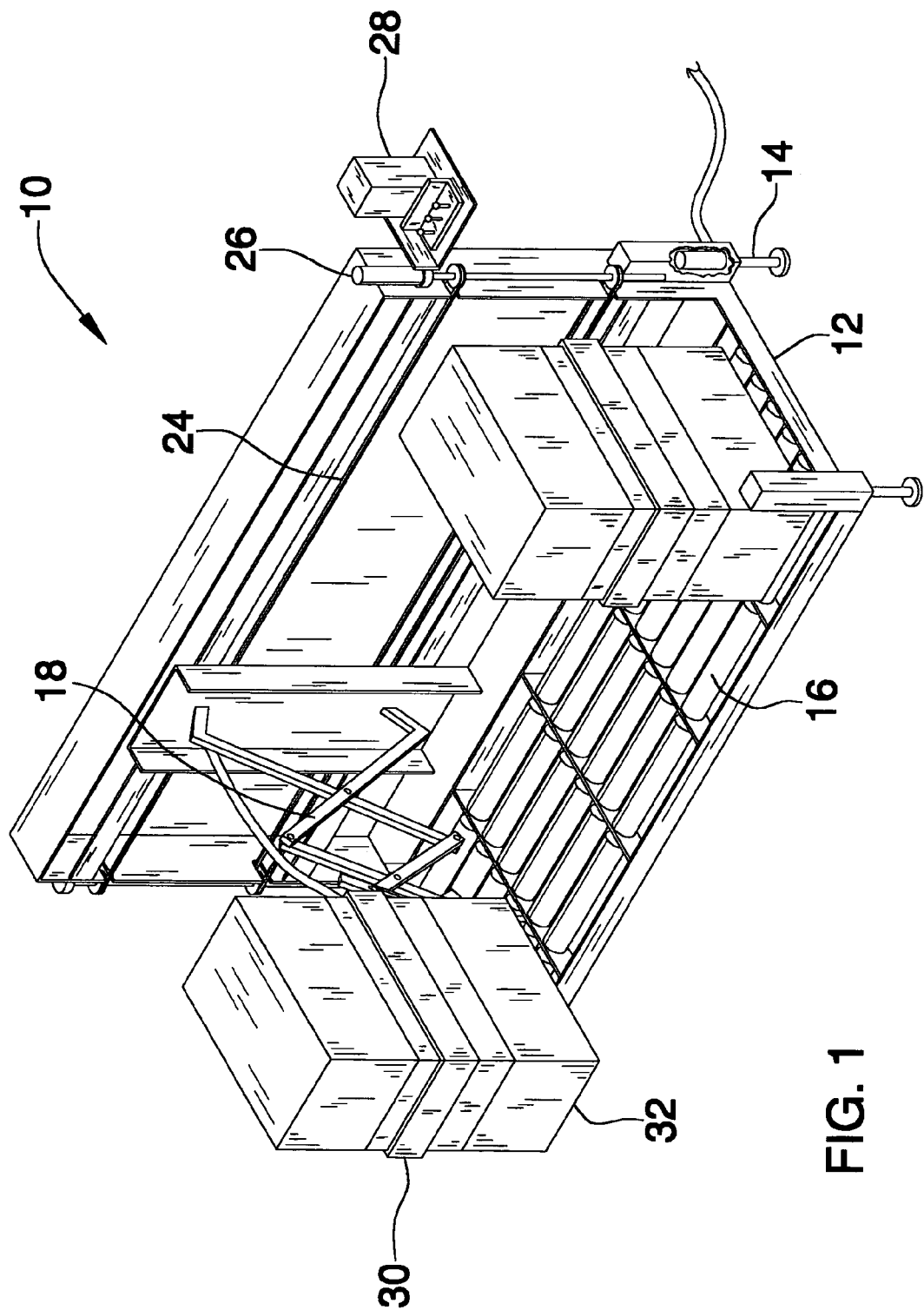
FIG. 1 is a top perspective view of the preferred embodiment of the hydraulic battery changer constructed in accordance with the principles of the present invention.

Referring now to the drawings, and particularly to FIGS. 1–6, a preferred embodiment of the hydraulic battery changer of the present invention is shown and generally designated by the reference numeral 10.

In FIG. 1, a new and improved hydraulic battery changer 10 of the present invention for electric vehicle battery conveying apparatus having a height adjustable roller rack with an extendable scissors mechanism is illustrated and will be described. More particularly, the hydraulic battery changer 10 has a frame 12. A height adjustable leg 14 is connected to the frame 12 for raising and lowering the frame 12. The height adjustable leg 14 is hydraulically actuated. A roller 16 is rotatably connected to the frame 12 for receiving a conventional electric vehicle battery 32 thereupon. An extendable scissors mechanism 18 is slidably connected to the frame 12. The extendable scissors mechanism 18 is hydraulically actuated. A pull knob 20 (shown in FIG. 2) is connected to the extendable scissors mechanism 18. The pull knob 20 is for securing to the conventional electric vehicle battery 32 for pulling the battery. A push panel 22 (shown in FIG. 2) is connected to the extendable scissors mechanism 18. The push panel 22 is for pushing the conventional electric vehicle battery 32. A scissors drive chain 24 is rotatably connected to the frame 12. The scissors drive chain 24 is drivingly connected to the extendable scissors mechanism 18. A drive motor 26 is drivingly connected to the scissors drive chain 24. A control panel 28 is connected to the frame 12. A slotted pulling bracket 30 (shown in FIG. 4) is connectable to the conventional electric vehicle battery 32.

Figure 2:
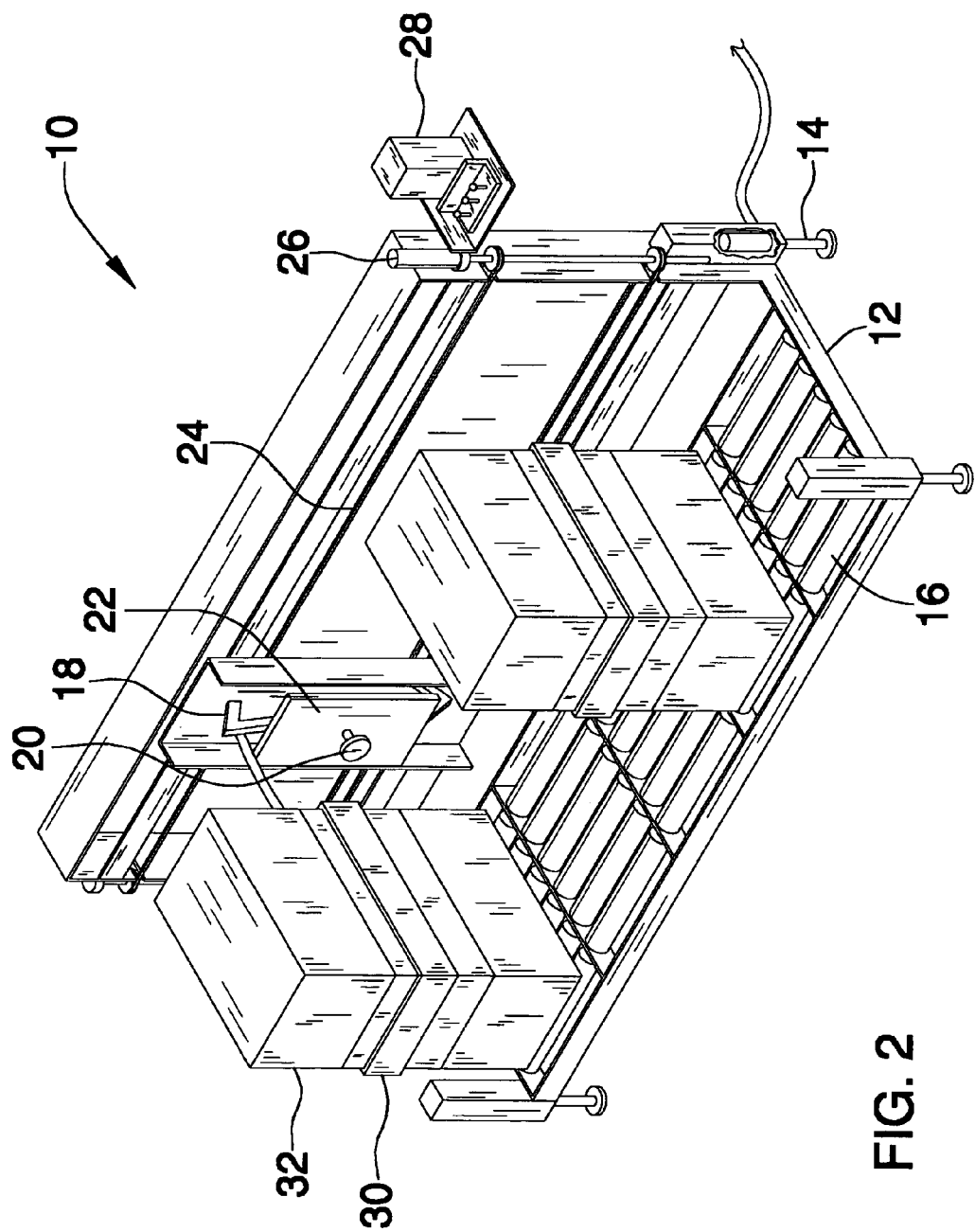
FIG. 2 is a top perspective view of the hydraulic battery changer of the present embodiment of the invention.

In FIG. 2, the hydraulic battery changer 10 is illustrated and will be described. More particularly, the hydraulic battery changer 10 has the frame 12. The height adjustable leg 14 is connected to the frame 12 for raising and lowering the frame 12. The height adjustable leg 14 is hydraulically actuated. The roller 16 is rotatably connected to the frame 12 for receiving the conventional electric vehicle battery 32 thereupon. The extendable scissors mechanism 18 is slidably connected to the frame 12. The extendable scissors mechanism 18 is hydraulically actuated. The pull knob 20 is connected to the extendable scissors mechanism 18. The pull knob 20 is for securing to the conventional electric vehicle battery 32 for pulling the battery. The push panel 22 is connected to the extendable scissors mechanism 18. The push panel 22 is for pushing the conventional electric vehicle battery 32. The scissors drive chain 24 is rotatably connected to the frame 12. The scissors drive chain 24 is drivingly connected to the extendable scissors mechanism 18. The drive motor 26 is drivingly connected to the scissors drive chain 24. The control panel 28 is connected to the frame 12. The slotted pulling bracket 30 (shown in FIG. 4) is connectable to the conventional electric vehicle battery 32.

Figure 3:
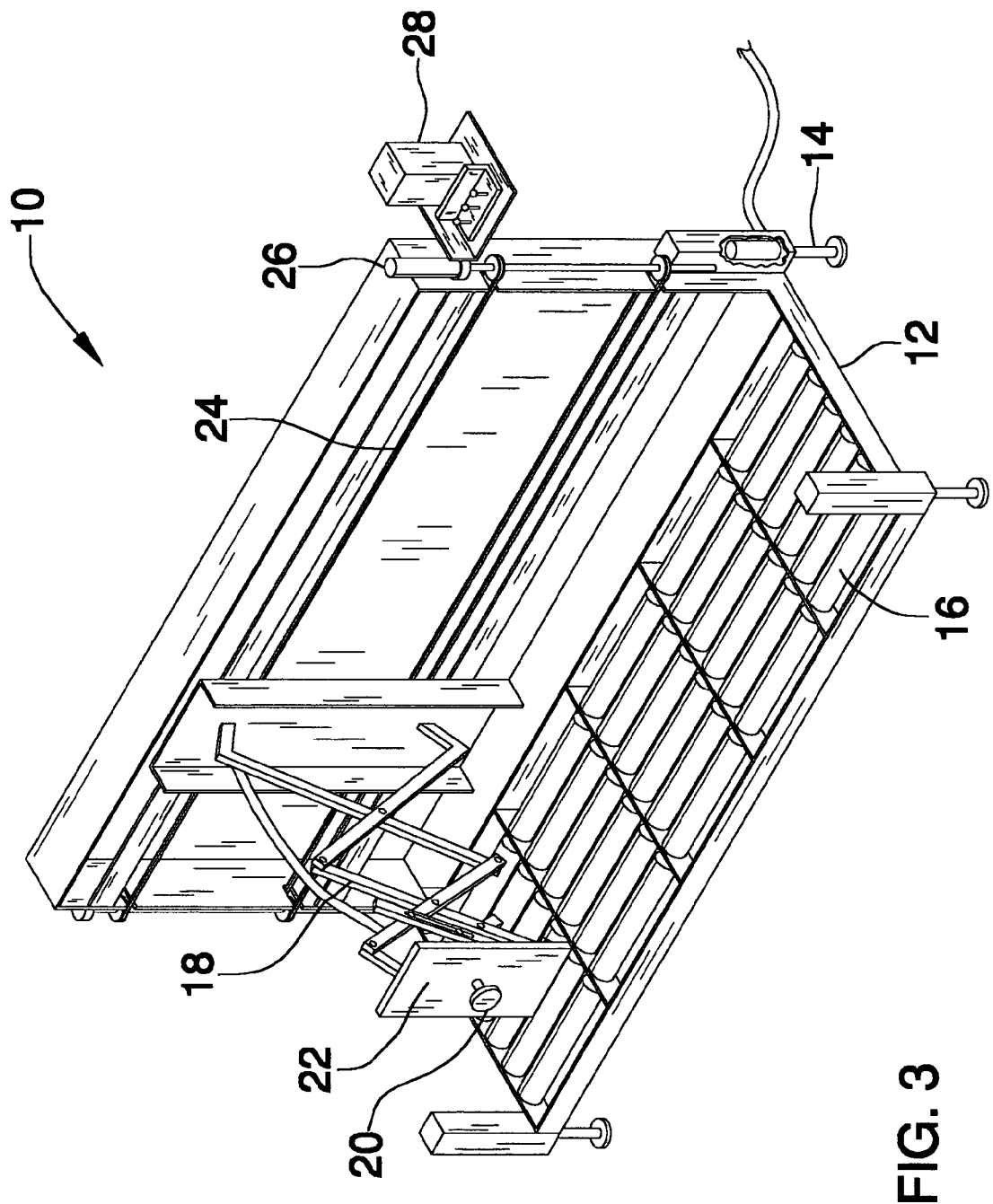
FIG. 3 is a top perspective view of the hydraulic battery changer of the present embodiment of the invention.

In FIG. 3, the hydraulic battery changer 10 is illustrated and will be described. More particularly, the hydraulic battery changer 10 has the frame 12. The height adjustable leg 14 is connected to the frame 12 for raising and lowering the frame 12. The height adjustable leg 14 is hydraulically actuated. The roller 16 is rotatably connected to the frame 12 for receiving the conventional electric vehicle battery 32 thereupon. The extendable scissors mechanism 18 is slidably connected to the frame 12. The extendable scissors mechanism 18 is hydraulically actuated. The pull knob 20 is connected to the extendable scissors mechanism 18. The pull knob 20 is for securing to the conventional electric vehicle battery 32 for pulling the battery. The push panel 22 is connected to the extendable scissors mechanism 18. The push panel 22 is for pushing the conventional electric vehicle battery 32. The scissors drive chain 24 is rotatably connected to the frame 12. The scissors drive chain 24 is drivingly connected to the extendable scissors mechanism 18. The drive motor 26 is drivingly connected to the scissors drive chain 24. The control panel 28 is connected to the frame 12.

Figure 4:
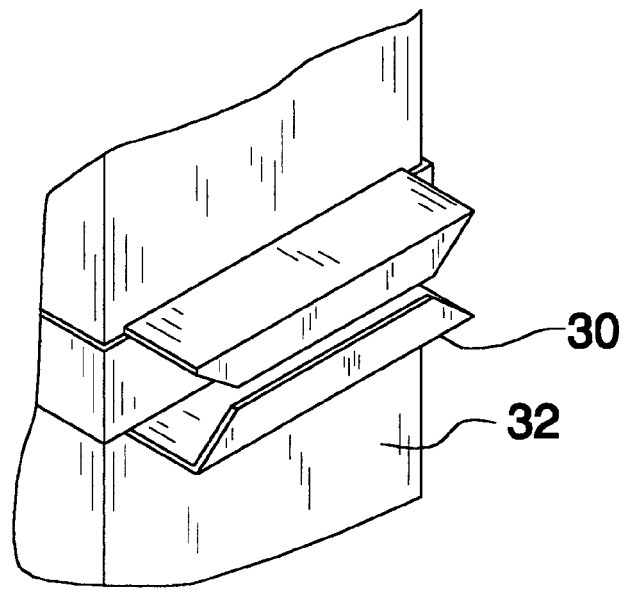
FIG. 4 is a top perspective view of the battery pulling bracket of the hydraulic battery changer of the present embodiment of the invention.

In FIG. 4, the hydraulic battery changer 10 is illustrated and will be described. More particularly, The slotted pulling bracket 30 is connectable to the conventional electric vehicle battery 32.

Figure 5:
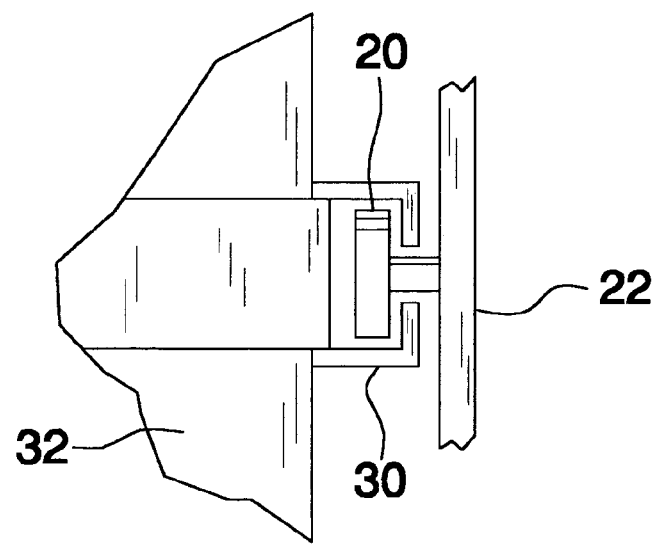
FIG. 5 is a side view of the battery pulling bracket of the hydraulic battery changer of the present embodiment of the invention.

In FIG. 5, the hydraulic battery changer 10 is illustrated and will be described. More particularly, The slotted pulling bracket 30 is connectable to the conventional electric vehicle battery 32.

In use, it can now be understood that the conventional electric vehicle having a nearly spent battery pack may be driven up to the frame 12. The conventional electric vehicle battery 32 has the slotted pulling bracket 30 which can be engaged with the pull knob 20. If necessary the extendable scissors mechanism 18 may be moved laterally by the scissors drive chain 24 driven by the drive motor 26 in order to make proper connection between the pull knob 20 and the slotted pulling bracket 30.

When the pull knob 20 and the slotted pulling bracket 30 are properly engaged the extendable scissors mechanism is actuated to pull the conventional electric vehicle battery 32 out of the conventional electric vehicle onto the roller 16 where the conventional electric vehicle battery can be left for recharging.

The conventional electric vehicle can be moved laterally of the frame 12 by using jumper cables from the conventional electric vehicle battery 32 on the platform to place the vehicle adjacent to the fresh conventional electric vehicle battery.

While a preferred embodiment of the hydraulic battery changer has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present embodiment of the invention. For example, any suitable sturdy material such as aluminum or composite may be used instead of the steel frame described. And although electric vehicle battery conveying apparatus having a height adjustable roller rack with an extendable scissors mechanism have been described, it should be appreciated that the hydraulic battery changer herein described is also suitable for removal and storage of goods.

Therefore, the foregoing is considered as illustrative only of the principles of the embodiment of the invention. Further, since numerous modifications and changes will readily occur to those skilled in the art, it is not desired to limit the embodiment of the invention to the exact construction and operation shown and described, and accordingly, all suitable modifications and equivalents may be resorted to, falling within the scope of the embodiment of the invention.

I claim:

1. A hydraulic battery changer comprising:
   a frame;
   a height adjustable leg connected to said frame for raising and lowering said frame, said height adjustable leg is hydraulically actuated;
   a roller rotatable connected to said frame for receiving a electric vehicle battery thereupon;
   an extendable scissors mechanism slidably connected to said frame, said extendable scissors mechanism is hydraulically actuated;
   a pull knob connected to said extendable scissors mechanism, said pull knob for securing to said electric vehicle battery for pulling said battery; and
   a scissors drive chain rotatably connected to said frame, said scissors drive chain drivingly connected to said extendable scissors mechanism.

2. The hydraulic battery changer of claim 1 further comprising:
   a drive motor drivingly connected to said scissors drive chain.

3. The hydraulic battery changer of claim 1 further comprising:
   a control panel connected to said frame.

4. A hydraulic battery changer comprising:
   a frame;
   a height adjustable leg connected to said frame for raising and lowering said frame, said height adjustable leg is hydraulically actuated;
   a roller rotatably connected to said frame for receiving a electric vehicle battery thereupon;
   an extendable scissors mechanism slidably connected to said frame, said extendable scissors mechanism is hydraulically actuated; and
   a pull knob connected to said extendable scissors mechanism, said pull knob for securing to said electric vehicle battery for pulling said battery.

5. The hydraulic battery changer of claim 4 further comprising:
   a push panel connected to said extendable scissors mechanism, said push panel for pushing said electric vehicle battery.

6. The hydraulic battery changer of claim 5 further comprising:
   a scissors drive chain rotatably connected to said frame, said scissors drive chain drivingly connected to said extendable scissors mechanism.

7. The hydraulic battery changer of claim 6 further comprising:
   a drive motor drivingly connected to said scissors drive chain.

8. The hydraulic battery changer of claim 7 further comprising:
   a control panel connected to said frame.

9. The hydraulic battery changer of claim 8 further comprising:
   a slotted pulling bracket connectable to a electric vehicle battery.

10. A hydraulic battery changer comprising:
    a frame;
    a height adjustable leg connected to said frame for raising and lowering said frame, said height adjustable leg is hydraulically actuated;
    a roller rotatably connected to said frame for receiving a electric vehicle battery thereupon;
    an extendable scissors mechanism slidably connected to said frame, said extendable scissors mechanism is hydraulically actuated;
    a pull knob connected to said extendable scissors mechanism, said pull knob for securing to said electric vehicle battery for pulling said battery;
    a push panel connected to said extendable scissors mechanism, said push panel for pushing said electric vehicle battery;
    a scissors drive chain rotatably connected to said frame, said scissors drive chain drivingly connected to said extendable scissors mechanism;
    a drive motor drivingly connected to said scissors drive chain;
    a control panel connected to said frame; and
    a slotted pulling bracket connectable to a electric vehicle battery.

* * * * *